United States Patent [19]

Simmons et al.

[11] 3,808,947

[45] May 7, 1974

[54] ELECTRO-HYDRAULIC ACTUATOR ARRANGEMENT

[75] Inventors: John Richard Simmons, Wolverhampton; Roy Westbury, Bridgenorth, both of England

[73] Assignee: Lucas Aerospace Limited, Birmingham, England

[22] Filed: Oct. 4, 1972

[21] Appl. No.: 294,859

[30] Foreign Application Priority Data
Oct. 5, 1971 Great Britain ............ 46215/71

[52] U.S. Cl. ............ 91/363 A, 91/441, 91/445, 91/461, 92/23
[51] Int. Cl. ............ F15b 9/03, F15b 9/09
[58] Field of Search ......... 91/363 A, 445, 363 R, 1, 91/461

[56] References Cited
UNITED STATES PATENTS
3,338,139  8/1967  Wood .................... 91/363 A
3,411,410  11/1968  Westbury et al. ......... 91/363 A
3,426,650  2/1969  Jenny .................... 91/363 A
3,540,350  11/1970  Heine .................... 91/363 A
3,702,575  11/1972  Campbell ................ 91/363 A Primary Examiner—Paul E. Maslousky
Attorney, Agent, or Firm—Holman & Stern

[57] ABSTRACT

An electro-hydraulic actuating arrangement as two servo control valves responsive to respective, nominally identical signals to provide output pressures, a further servo valve responsive to the output pressures of either, or both, servo control valves to provide operating pressures to selected sides of a piston actuator, an secondary actuator responsive to a difference between said output pressures to modify said electrical control signals in a way to reduce said difference, and lock valve responsive to a failure of a supply pressure, a failure of said electrical signals, or an increase in said pressure difference beyond a predetermined amount, to isolate both sides of said piston, and thereby prevent operation of the arrangement.

21 Claims, 1 Drawing Figure

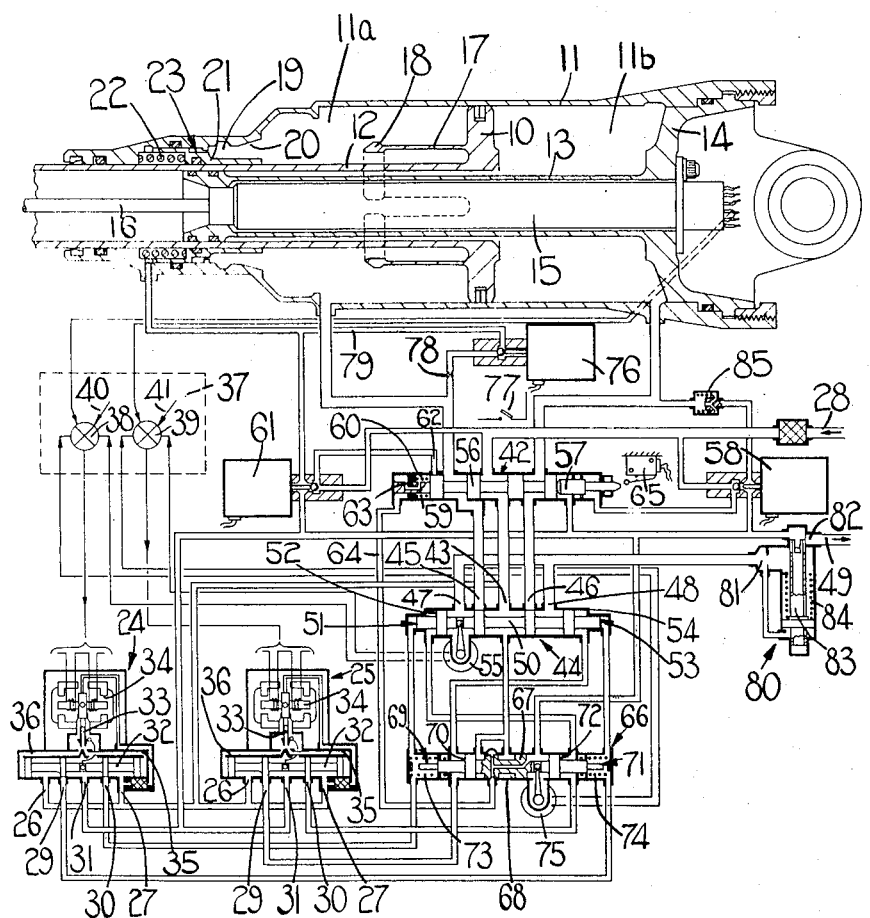

ature in the valve 25 and, in a manner later to be described, with a hydraulic pressure supply line 28. Valve 24 also has a pair of outlet ports 29, 30 and an exhaust port 31. Associated with ports 26, 27, 29, 30, 31 is a valve spool 32 which is axially movable, in response to pressures applied at its respective ends, between a position in which ports 26, 29 and ports 30, 31 respectively intercommunicate and a position in which ports 27, 30 and ports 29, 31 respectively intercommunicate. The pressures applied to the respective ends of spool 32 are derived from the pressure at port 27 via a nozzle 33 pivotally movable by a torque motor 34 so as to be alignable with either of a pair of passages 35, 36 through which pressures are conveyed to the ends of spool 30. Torque motor 34 is responsive to electrical signals from a control circuit, shown generally at 37. Circuit 37 includes a pair of summing junctions 38, 39 respectively associated with valves 24, 25 and receiving nominally identical command signals via respective lines 40, 41. Junctions 38, 39 also receive inputs from the respective tracks of potentiometer 15, these inputs acting to modify the command signals.

ELECTRO-HYDRAULIC ACTUATOR ARRANGEMENT

This invention relates to electro-hydraulic actuating arrangements.

According to the invention an electro-hydraulic actuating arrangement comprises a cylinder, a piston slidable in the cylinder and defining a pair of chambers therein, first and second servo control valves each having a pair of outlet ports and being respectively responsive to first and second electrical control signals to supply a fluid signal pressure to selected ones of the ports in each pair and to connect the others of the ports in each pair to a return line, a third servo control valve having a pair of outlet ports and being operable in response to a difference between the pressures at the ports of either of the first and second control valves to apply a fluid supply pressure to a selected one of said cylinder chambers and to connect the other of said chambers to a return line, a servo controlled lock valve between said third valve and said cylinder and operable in response to a servo pressure signal derived from said supply pressure to isolate said chambers, a valve responsive to a third electrical control signal to control said servo pressure signal, a secondary actuating device operable in response to a difference between the signal pressures supplied by the first and second valves and first, second and third sensing means respectively responsive to the positions of said piston, said third control valve and said secondary actuating device to provide electrical signals for modifying said first and second electrical signals.

An example of the invention will now be described with reference to the accompanying drawings.

A piston 10 is slidable in a cylinder 11 and has a tubular stem 12 which provides the actuator output. A spigot 13 extends from an end wall 14 of cylinder 11 and is sealingly slidable within the stem 12. Spigot 13 encloses a twin track potentiometer 15 which serves as a linear displacement transducer to provide a pair of electrical signals dependent on the position of piston 11. Potentiometer 15 has an input rod 16 secured to the stem 13 at the end thereof remote from the head of piston 10.

Piston 10 defines chambers 11a and 11b in cylinder 11. Piston 10 also includes axially extending spring fingers 17 having projections 18 which are engageable in complementary recesses 19 in the wall of cylinder 11. Adjacent the recesses 19 is a ramp 20 which deflects fingers 17 inwards as the piston 10 moves left, as seen in the drawing whereby projections 18 enter recess 19 with a spring action. Slidably and sealingly engaging both cylinder 11 and stem 12 is a sleeve 21. A spring 22 biases sleeve 21 towards engagement with a stop, in which position a circumferential face 23 on sleeve 21 can engage the inner face on projections 18 to prevent the latter from being drawn out of recesses 19, thereby latching the piston 10 in position. During leftward movement of piston 10 the inward displacement by ramp 20 of fingers 17 enables the latter to engage sleeve 21 and move it against spring 22, sleeve 21 subsequently moving right, when projections 18 have entered recesses 19, to latch the piston 10.

The arrangement includes a pair of identical electrically-operated servo control valves 24, 25 one of which will be described in detail. Valve 24 has a pair of inlet ports 26, 27 which communicate with corresponding The pressure supply line 28 communicates with ports 26, 27 of valves 24, 25 via a servo controlled lock valve 42, later to be described. Line 28 also communicates via valve 42 with an inlet port 43 of a control valve 44. Valve 44 also has a pair of outlet ports 45, 46 which respectively communicate via valve 42 with cylinder chambers 11a, 11b and a pair of exhaust ports 47, 48 which communicate with a low pressure return line 49, via a flow limiting valve 80. Valve 80 has an inlet 81, an outlet 82 and a piston control element 83 movable against a spring 84 by a rise in pressure at inlet 81 to reduce flow to outlet 82. Valve 44 includes a spool 50 having pairs of stepped piston surfaces 51, 52 and 53, 54 at its respective ends. Surfaces 51, 52 are subjected to the pressures at the ports 30 of the respective valves 24, 25 and surfaces 53, 54 are subjected to the pressures at the ports 29 of the respective valves 24, 25. Spool 50 is movable in one direction to interconnect ports 43, 45 and ports 46, 48 and the other direction to interconnect ports 43, 46 and ports 45, 47. Movement of spool 50 also rotates a twin track potentiometer 55 which provides signals dependent on the position of spool 50 to the junctions 38, 39.

Ports 45, 46 of valve 44 communicate with the respective cylinder chambers 11a, 11b via lock valves 42. Lock valve 42 includes a spool 56 movable between a first position in which pressure supply line 28 and chambers 11a, 11b communicate with valve 44 and a second shut position in which pressure is shut off from the valve 44 and chambers 11a, 11b are isolated to "freeze" piston 10. A piston 57 engages one end of spool 56 and is subjected via a solenoid valve 58 to the supply pressure, which urges valve 42 to its open position, the supply pressure being applied to piston 57 when valve 58, is energised. De-energisation of valve 58 subjects piston 57 to the return line pressure. Valve 58 will normally be energised, at all times when the arrangement is in use. Spool 56 is biased against piston 57 by a spring 59 and by the pressure in a chamber 60 which acts on the end of spool 56 remote from piston 57. Fluid pressure in line 28 is admitted to a chamber 60 via a solenoid valve 61, which is energised during initial starting of the arrangement, and via a port 62 controlled by the position of spool 56. Spool 56 includes a passage 63 whereby, when valve 42 is in the "open" position shown, chamber 60 communicates with a passage 64, chamber 60 being isolated from the supply pressure by spool 56. A micro-switch 65 is operated by spool 56 via piston 57 in the shut position of valve 42.

An actuating device 66 comprises a spool 67 slidable in a sleeve 68 and having pairs 69, 70 and 71, 72 of stepped piston surfaces at its respective ends. The effective areas of surfaces 69 and 70 are equal, as are the effective areas of surfaces 71, 72. Surfaces 69, 72 are subjected to the pressures at the ports 30 of the respective valves 24, 25. Surfaces 70, 71 are subjected to the pressures at the ports 29 of valves 25, 24 respectively. When the pressures at the ports 29 of valves 24, 25 are equal and when the pressures at ports 30 of valves 24, 25 are also equal the forces on spool 67 will be equal and it will be urged to a central position by springs 73, 74. Movable by device 66 is a twin track potentiometer 75 which provides signals, dependent on the position of spool 67, to the respective junctions 38, 39.

Spool 67 also provides a valve control element by means of which chamber 60 of lock valve 42 can communicate via passage 64 with return line 49 when spool 67 is in its central position, and with pressure supply line 28 when spool 67 is moved by any substantial amount in either direction from its central position.

A further solenoid-operated valve 76 is energised by means of a switch 77 to connect chamber 11a via a restrictor 78 and a passage 79 with return line 49. Chamber 11b communications via a non-return valve 85 with return line 49.

The actuator arrangement shown is particularly adapted for use in positioning the air intake ramps of an aircraft gas turbine engine.

Output signals from junctions 38, 39 operate torque motors 34 of valves 24, 25 respectively. Junctions 38, 39 are such that, when the algebraic sum of the command signals on lines 40, 41 respectively, with the signals on the feedback lines from potentiometers 15, 55, 75 is zero, there is no output from junctions 38, 39. When piston 10 is in the position demanded by a command signal the output from potentiometer 15 is equal in magnitude to the command signal. As piston 10 approaches the desired position, therefore, negative feedback from potentiometer 55 applies a correction to the control signals reaching valves 24, 25 tending to move spool 50 of valve 44 to its central position.

With solenoid valves 58, 61 energised, supply pressure is applied to piston 57 of lock valve 42 and removed from port 62. Spool 56 is thereby urged to its open position against spring 59. Port 62 is shut off by spool 56 and subsequent de-energisation of solenoid 61 on completion of the starting sequence has no effect on spool 56.

With lock valve 42 open, operation of valves 24, 25 moves spool 50 of control valve 44 in a desired direction. Additionally with lock valve 42 open, port 43 of control valve 44 communicates with pressure supply line 28 and ports 45, 46 with cylinder chambers 11a, 11b respectively. Actuation of control valve 44 by valves 24, 25 thus moves piston 10 in required directions, feedback signals from potentiometers 15, 55 acting to close the electro-hydraulic control loop.

During normal operation spool 67 of device 66 remains in its central position, whereby any pressure in chamber 60 of valve 42 passes via passages 63, 64 and device 66 to low pressure. Any significant disparity between the signal pressures at the ports of valves 24, 25 moves spool 67 from its central position, providing electrical output signals from potentiometer 75 which modifies the respective command signals on lines 40, 41 to correct the disparity. If spool 67 moves sufficiently far as to allow passage 64 to communicate with the high pressure supply, then spool 56 of lock valve 42 is urged to the right, the effective piston area within chamber 60 being greater than that of piston 57. Lock valve 42 thereby shuts, freezing piston 10 and isolating the remaining valves from the high pressure supply. Device 66 centralises, but chamber 60 is subjected to high pressure via port 62, and passage 63 is shut by movement of spool 56. This condition therefore obtains until solenoid valve 61 is re-energised releasing the high pressure in chamber 60, and allowing spool 56 to move to the left. If the command signal disparity persists, restoration of supply to valves 24, 25 and device 66 will once again send lock valve 42 to its shut position. When lock valve 42 is in its shut position, switch 65 is made to provide a failure warning on an external indicating circuit (not shown).

If, during normal operation, the high pressure supply fails, spring 59 moves spool 56 to the right to shut lock valve 42 as before. Subsequent restoration of pressure acts, as before, on chamber 60 to maintain valve 42 shut, and the apparatus will not become operative again until valve 61 is energised during a starting sequence.

Failure of the electrical supply during normal operation de-energises solenoid valve 58. The pressure on piston 57 thus falls to that in return line 49 and valve 42 once more moves to its shut position. Admission of high pressure fluid to chamber 60 ensures that valve 42 remains shut, even if electrical power is subsequently restored, until a starting sequence takes place.

Aerodynamic loads on the associated engine air intake ramps are such as to urge the piston 10 to the left, as seen in the drawing. If, therefore, with valve 42 shut, valve 76 is energised by switch 77, chamber 11a exhausts to the return line 49 and the piston 10 moves to the left at a speed which is limited by restrictor 78. Fluid enters chamber 11b via non-return valve 85, thereby preventing cavitation. Piston 10 can be arrested after a required amount of leftward movement by re-energising valve 76.

At the full extent of its leftward movement piston 10 is latched by engagement of fingers 17 in recesses 19. Sleeve 21 moves under the influence of spring 22 to retain fingers 17 in position, pressure in chamber 11a being that of the return line 49.

If, in the latched position of piston 10, a fluid pressure is applied to chamber 11a to urge piston 10 to the right, sleeve 21 is urged by this pressure to the left. Piston 10 unlatches and moves to the position determined by the command signals.

We claim:
1. An electro-hydraulic actuating arrangement comprising a cylinder, a piston slidable in the cylinder and defining a pair of chambers therein, first and second servo control valves each having a pair of outlet ports and being respectively responsive to first and second electrical control signals to supply a fluid signal pressure to selected ones of the ports in each pair and to connect the others of the ports in each pair to a return line, a third servo control valve having a pair of outlet ports and being operable in response to a difference be- tween the pressures at the ports of either of the first and second control valves to apply a fluid supply pressure to a selected one of said cylinder chambers and to connect the other of said chambers to a return line, a servo controlled lock valve between said third valve and said cylinder and operable in response to a servo pressure signal derived from said supply pressure to isolate said chambers, a valve responsive to a third electrical control signal to control said servo pressure signal, a secondary actuating device operable in response to a difference between the signal pressures supplied by the first and second valves and first, second and third sensing means respectively responsive to the positions of said piston, said third control valve and said secondary actuating device to provide electrical signals for modifying said first and second electrical signals.

2. An arrangement as claimed in claim 1 in which said first and second valves each includes a spool control element responsive to a respective one of said electrical control signals.

3. An arrangement as claimed in claim 2 in which said first and second valves each includes a torque motor responsive to a respective one of said electrical control signals to apply a servo operating pressure to respective ends of the associated spool control element.

4. An arrangement as claimed in claim 1 in which said third servo control valve includes a spool control member movable in one direction by the pressures at said ones of said pairs of output ports and in the other direction by the pressures at said others of said pairs of outlet ports.

5. An arrangement as claimed in claim 4 in which said spool control member is provided at each of its ends with a pair of stepped piston surfaces, one surface in each said pair of surfaces being subjected to the pressures at said ones of said pairs of outlet ports and the other surface in each said pair of surfaces being subjected to the pressures at said pairs of outlet ports.

6. An arrangement as claimed in claim 4 in which said second sensing means comprises an electrical potentiometer movable by said spool control member.

7. An arrangement as claimed in claim 6 in which said potentiometer is a twin-track potentiometer.

8. An arrangement as claimed in claim 1 in which said lock valve includes a pair of inlets respectively communicating with the outlet ports of said third servo control valve, and a pair of outlets respectively communicating with said pair of cylinder chambers.

9. An arrangement as claimed in claim 8 in which said lock valve includes a spool closure member and means biasing said closure member against said servo pressure signal.

10. An arrangement as claimed in claim 9 which includes valve means for subjecting said closure member to a further servo pressure signal which can move the closure member against the first-mentioned servo pressure signal to shut the lock valve.

11. An arrangement as claimed in claim 10 in which said valve means includes a further valve responsive to a fourth electrical signal and energised during starting of the arrangement to cause said further servo pressure signal to be substantially equal to the pressure in said return line, and thereby to open the lock valve.

12. An arrangement as claimed in claim 11 which includes means for rendering said further servo pressure signal independent of operation of said further valve when said lock valve is open.

13. An arrangement as claimed in claim 11 in which said valve means also includes a valve device forming part of said secondary actuating device and being operable when the difference between the pressures at said selected ones of the pairs of ports of the first and second valves, or between the pressures at said others of said pairs of ports, exceeds a predetermined amount to cause said further servo pressure signal to be substantially equal to said supply pressure, and thereby to shut the lock valve.

14. An arrangement as claimed in claim 1 in which said secondary actuating device comprises a spool element provided at each of its ends with a pair of stepped piston surfaces, the effective areas of all of the surfaces being substantially equal, the pair of surfaces at one end of said spool element being subjected respectively to the pressures at said one of the outlet ports of the first servo valve and at said other of the outlet ports of the second servo valve, and the surfaces at the other end of said spool element being subjected respectively to the pressures at said other of the outlet ports of the first servo valve and at said one of the outlet ports of the second servo valve.

15. An arrangement as claimed in claim 14 in which said third sensing means comprises an electrical potentiometer movable by said spool element of said secondary actuating device.

16. An arrangement as claimed in claim 15 in which said potentiometer is a twin track potentiometer.

17. An arrangement as claimed in claim 1 which includes a valve responsive to an additional electrical signal to connect one of said piston chambers to said return line.

18. An arrangement as claimed in claim 17 which includes a non-return valve between the other piston chamber and said return line, whereby when said one chamber is connected to the return line and said piston is moved by an external load to discharge fluid from said one chamber, fluid is drawn from said return line into the other chamber.

19. An arrangement as claimed in claim 1 which includes a pair of electrical summing junctions adapted to receive nominally identical command signals and respectively providing said first and second electrical signals.

20. An arrangement as claimed in claim 19 in which said summing junctions are each responsive to the signals from said first, second and third sensing means.

21. An arrangement as claimed in claim 1 in which said first sensing means comprises a linear displacement transducer in the form of a twin track electrical potentiometer.

* * * * *